United States Patent [19]

Tsuchiya et al.

[11] 3,725,546
[45] Apr. 3, 1973

[54] CERTAIN PHOSPHORODITHIOLATES AS INSECTICIDES AND FUNGICIDES

[75] Inventors: Hiroshi Tsuchiya, Ashiya; Kunio Mukai, Nishinomiya; Akio Kimura, Takarazuka; Keimei Fujimoto, Kyoto; Toshiaki Ozaki; Sigeo Yamamoto, both of Toyonaka; Yositosi Okuno, Nishinomiya; Taizo Ogawa, Minoo; Toshiyuki Wakatsuki, Kyoto; Yoshihiko Nishizawa, Nara, all of Japan

[73] Assignee: Sumitomo Chemical Company, Ltd., Osaka, Japan

[22] Filed: Aug. 5, 1970

[21] Appl. No.: 61,468

Related U.S. Application Data

[63] Continuation-in-part of Ser. No. 690,725, Dec. 15, 1967, abandoned.

[52] U.S. Cl. ...............424/225, 424/218, 424/219, 424/224
[51] Int. Cl. ...........................................A01n 9/36
[58] Field of Search..............424/218, 224, 225, 219

[56] References Cited

UNITED STATES PATENTS 3,641,221  2/1972  Schrader et al. ..................260/949

FOREIGN PATENTS OR APPLICATIONS 938,850  10/1963  Great Britain.......................424/224

Primary Examiner—Albert T. Meyers
Assistant Examiner—Vincent D. Turner
Attorney—Stevens, Davis, Miller & Mosher

[57]  ABSTRACT

Method for controlling insects and fungi, in which the insects and fungi are contacted with a phosphorodithiolate of the formula,

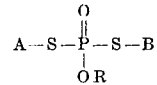

wherein R is a lower alkyl; A is a lower alkyl, etc.; and B is phenylalkyl, etc. Two typical examples of the phosphorodithiolates are shown by the formula

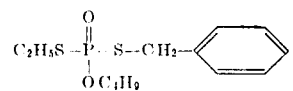

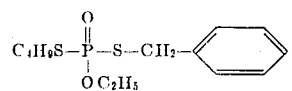

The compounds can be prepared by condensing a dithioate of the formula,

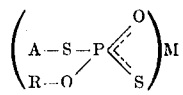

wherein A and R are as mentioned above and M is an alkali metal or ammonium group, with a halide of the formula,

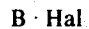

wherein B is as mentioned above and Hal is a halogen.

6 Claims, No Drawings

CERTAIN PHOSPHORODITHIOLATES AS INSECTICIDES AND FUNGICIDES

This application is a Continuation-in-Part of U.S. Ser. No. 690,725 filed on Dec. 15, 1967 now abandoned.

The present invention relates to a novel use of phosphorodithiolates of the formula,

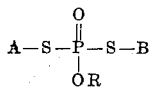

wherein R is a $C_1 - C_5$ alkyl group, A is an alkyl group, a cycloalkyl group or a phenylalkyl group of the formula,

wherein D is an alkylene group, X is a hydrogen atom, a halogen atom, an alkyl group or a nitro group and $n$ is an integer of 1 to 5, and B is an alkyl group, an alkenyl group, an alkynyl group, a haloalkyl group or a phenylalkyl group of the formula,

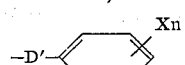

wherein D' is an alkylene group and X and $n$ have same meanings as defined above, provided that B is a phenylalkyl group when A is an alkyl group and that the total number of the carbon atoms of the alkylene groups of D and D' is 3 or more when both A and B are the phenylalkyl groups.

At present, the application as agricultural chemicals of organo-mercuric compounds, which have been used in extremely large quantities, comes into serious problem due to their strong toxicity to men and cattle.

Hitherto, it is known that there are various kinds of organo-phosphorous compounds having either insecticidal activity or fungicidal activity. However, there has not been known any organo-phosphorous compound which has insecticidal activity as well as fungicidal activity.

The present inventors made repeated studies to find chemicals which maintain strong activity against insects and fungi without toxicity to mammals. As a result, the present inventors have found phosphorodithiolates of the above-mentioned formula are excellent agricultural insecticide and fungicide.

One object of the present invention is to provide a novel insecticidal and fungicidal use of the phosphorodithiolates of the above-mentioned formula. Other objects of the present invention will be clear from the following description.

In order to accomplish these objects, the present invention provides a method for controlling insects and fungi, which comprises contacting the insects and fungi with a phosphorodithiolate of the above-mentioned formula.

According to the present invention, the compounds of the present invention have such broad and excellent biological effects that they can control fungi simultaneously with injurious insects. In addition, they contain no such poisonous heavy metal as in the case of the organo-mercuric compounds and hence bring about a great advantage in handling.

The compounds of the present invention, which are represented by the formula as mentioned above, are obtained by reacting dithioate represented by the formula,

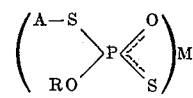

wherein A and R are as mentioned before; and M is an alkali metal atom or ammonium group, with halides represented by the formula,

wherein B is as mentioned before; and Hal is a halogen atom.

Generally, the reaction of said dithioate with said halides is effected in the presence of organic solvents or water as solvents. When there are used as solvents those which are relatively high in polarity such as water, alcohols, ketones and acetonitrile, favorable results are obtained. However, there are some cases where the desired compounds can be obtained in high yields even in the absence of solvent.

The reaction conditions vary depending on the kind of starting materials employed. Generally, however, the reaction temperature is from room temperature to about 100°C., and the reaction time is from 1 hour to about 20 hours. If the starting materials employed are difficult to react, reaction accelerator, e.g. iodide, may be added, whereby the reaction rates can be accelerated and the yields can be increased. After completion of the reaction, ordinary after-treatments are effected to obtain the desired compounds.

The phosphorodithiolates of the above-mentioned formula in which R is a $C_1 - C_5$ alkyl; A is a phenylalkyl of the formula,

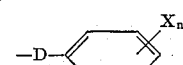

wherein D, X and $n$ are as defined above; and B is an alkenyl group, an alkynyl group or a haloalkyl group; are novel compounds, and those in which R is a $C_2 - C_5$ alkyl are preferably with respect to biological activity.

The dithiol phosphates obtained in the above manner may be practically used as such; but may further be purified according to column chromatography.

Typical examples of the compounds of the present invention are as exemplified below, but compounds which are in accord with the object of the present invention are, of course, not limited to these.

TABLE (1)
$C_2H_5O-\overset{O}{\underset{\|}{P}}\overset{SC_2H_5}{\diagdown}\!\!\diagup\!\!\overset{}{SCH_2-}\!\!\bigcirc$ (2)
$C_4H_9O-\overset{O}{\underset{\|}{P}}\overset{SC_2H_5}{\diagdown}\!\!\diagup\!\!\overset{}{SCH_2-}\!\!\bigcirc$ (3)
$C_2H_5O-\overset{O}{\underset{\|}{P}}\overset{S-(C_4H_9\text{-sec.})}{\diagdown}\!\!\diagup\!\!\overset{}{S-CH_2-}\!\!\bigcirc$ (4)
$C_2H_5O-\overset{O}{\underset{\|}{P}}\overset{S-(C_5H_{11}\text{-iso.})}{\diagdown}\!\!\diagup\!\!\overset{}{S-CH_2-}\!\!\bigcirc$ (5)
$C_2H_5O-\overset{O}{\underset{\|}{P}}\overset{S-\bigcirc\!\!\text{-}H}{\diagdown}\!\!\diagup\!\!\overset{}{S-CH_2-}\!\!\bigcirc$ TABLE—Continued (6) $C_2H_5O-\underset{S-CH_2-C_6H_5}{\overset{O}{\underset{\|}{P}}}\overset{S-CH_2C\equiv CH}{}$ (7) $C_2H_5O-\underset{S-CH_2-C_6H_5}{\overset{O}{\underset{\|}{P}}}\overset{S-CH_2CH=CH_2}{}$ (8) $C_2H_5O-\underset{S-CH_2-C_6H_5}{\overset{O}{\underset{\|}{P}}}\overset{S-C(CH_3)=CH_2}{}$ (9) $C_2H_5O-\underset{S-CH_2-C_6H_5}{\overset{O}{\underset{\|}{P}}}\overset{SCH_2CH_2CH_2Cl}{}$

(10) $C_2H_5O-\underset{S-CH_2-C_6H_5}{\overset{O}{\underset{\|}{P}}}\overset{S-CH_2CHCl-CH_2Cl}{}$

(11) $n\text{-}C_3H_7O-\underset{S-CH_2-C_6H_5}{\overset{O}{\underset{\|}{P}}}\overset{SCH_2CH_2CH_2Cl}{}$

(12) $C_2H_5O-\underset{SCH_2-C_6H_5}{\overset{O}{\underset{\|}{P}}}\overset{S(C_4H_9\text{-}n)}{}$

(13) $n\text{-}C_4H_9O-\underset{SCH_2-C_6H_5}{\overset{O}{\underset{\|}{P}}}\overset{S(C_4H_9\text{-}n)}{}$

(14) $C_2H_5O-\underset{SCH_2-C_6H_5}{\overset{O}{\underset{\|}{P}}}\overset{S(C_4H_9\text{-iso.})}{}$

(15) $C_2H_5O-\underset{SCH_2-C_6H_5}{\overset{O}{\underset{\|}{P}}}\overset{S(C_8H_{17}\text{-}n)}{}$

(16) $C_2H_5O-\underset{S-C_6H_{11}}{\overset{O}{\underset{\|}{P}}}\overset{SC_2H_5}{}$

(17) $C_2H_5O-\underset{S-C_6H_{11}}{\overset{O}{\underset{\|}{P}}}\overset{S(C_3H_7\text{-}n)}{}$

(18) $C_2H_5O-\underset{S-C_6H_{11}}{\overset{O}{\underset{\|}{P}}}\overset{S(C_4H_9\text{-}n)}{}$

(19) $C_2H_5O-\underset{S-C_6H_{11}}{\overset{O}{\underset{\|}{P}}}\overset{S(C_4H_9\text{-tert.})}{}$

(20) $C_2H_5O-\underset{S-C_6H_{11}}{\overset{O}{\underset{\|}{P}}}\overset{SCH_2CH=CH_2}{}$

(21) $C_2H_5O-\underset{S-C_6H_{11}}{\overset{O}{\underset{\|}{P}}}\overset{S-C(CH_3)=CH_2}{}$

(22) $C_6H_5-CH_2\cdot CH_2\cdot S-\underset{OC_2H_5}{\overset{O}{\underset{\|}{P}}}-S\cdot CH_2-C_6H_5$

(23) $C_6H_5-CH_2\cdot CH_2\cdot S-\underset{OC_2H_5}{\overset{O}{\underset{\|}{P}}}-S\cdot CH(CH_3)-C_6H_5$

(24) $C_6H_5-CH_2\cdot CH_2\cdot S-\underset{OC_2H_5}{\overset{O}{\underset{\|}{P}}}-S\cdot CH_2\cdot CH_2-C_6H_5$

(25) $C_6H_5-CH_2\cdot CH_2\cdot S-\underset{OC_2H_5}{\overset{O}{\underset{\|}{P}}}-S\cdot C_3H_7\text{-}n$

(26) $C_6H_5-CH_2\cdot CH_2\cdot S-\underset{OC_2H_5}{\overset{O}{\underset{\|}{P}}}-S\cdot C_4H_9\text{-sec.}$

(27) $C_6H_5-CH_2\cdot CH_2\cdot S-\underset{OC_2H_5}{\overset{O}{\underset{\|}{P}}}-S\cdot C_4H_9\text{-}n$

(28) $C_6H_5-CH_2\cdot CH_2\cdot S-\underset{OC_2H_5}{\overset{O}{\underset{\|}{P}}}-S\cdot C_5H_{11}\text{-iso.}$

(29) $C_6H_5-CH_2\cdot CH_2\cdot S-\underset{OC_2H_5}{\overset{O}{\underset{\|}{P}}}-S\cdot C_8H_{17}\text{-}n$

(30) $C_6H_5-CH_2\cdot CH_2\cdot S-\underset{OC_3H_7\text{-}n}{\overset{O}{\underset{\|}{P}}}-S\cdot CH_2\cdot CH=CH_2$

(31) $C_6H_5-CH_2\cdot CH_2\cdot S-\underset{OC_2H_5}{\overset{O}{\underset{\|}{P}}}-S\cdot CH_2\cdot CH_2Cl$

(32) $C_6H_5-CH(CH_3)-S-\underset{OC_2H_5}{\overset{O}{\underset{\|}{P}}}-S\cdot CH_2-C_6H_5$

(33) $C_6H_5-CH(CH_3)-S-\underset{OC_2H_5}{\overset{O}{\underset{\|}{P}}}-S\cdot CH(CH_3)-C_6H_5$

(34) $C_6H_5-CH(CH_3)-S-\underset{OC_2H_5}{\overset{O}{\underset{\|}{P}}}-S\cdot C_4H_9\text{-}n$

(35) $C_6H_5-CH(CH_3)-S-\underset{OC_2H_5}{\overset{O}{\underset{\|}{P}}}-S\cdot C_{10}H_{21}\text{-}n$

(36) $C_6H_5-CH(CH_3)-S-\underset{OC_2H_5}{\overset{O}{\underset{\|}{P}}}-S\cdot CH_2-C(CH_3)=CH_2$

(37) $C_6H_5-CH(CH_3)-S-\underset{OC_2H_5}{\overset{O}{\underset{\|}{P}}}-S\cdot CH_2C\equiv CH$

(38) $C_6H_5-CH(CH_3)-S-\underset{OC_2H_5}{\overset{O}{\underset{\|}{P}}}-S-C_6H_{11}$ TABLE—Continued

(39) Ph-CH(CH₃)-S-P(=O)(OC₂H₅)-S-CH₂·CH₂Cl

(40) Ph-CH(CH₃)-S-P(=O)(OC₂H₅)-S-CH₂·CH₂·CH₂Cl

(41) Ph-CH₂·CH₂-S-P(=O)(OC₂H₅)-S-C₆H₁₁ (cyclohexyl)

(42) Ph-CH₂·CH₂-S-P(=O)(OC₂H₅)-S-C₄H₉-iso

(43) C₂H₅S-P(=O)(OC₂H₅)-S-CH₂-C₆H₄-Cl (para)

(44) n-C₄H₉S-P(=O)(OC₂H₅)-S-CH₂-C₆H₄-CH₃
(45) (Mixture of ortho- and para-forms.)

n-C₈H₁₇S-P(=O)(OC₂H₅)-S-CH₂-C₆H₄-Cl (ortho)

(46) n-C₄H₉S-P(=O)(OC₂H₅)-S-CH₂-C₆H₄-Cl (ortho)

(47) n-C₄H₉S-P(=O)(OC₂H₅)-S-CH₂-C₆H₄-Cl (para)

(48) n-C₄H₉S-P(=O)(OC₂H₅)-S-CH₂-C₆H₃(CH₃)₂

(49) n-C₄H₉S-P(=O)(OC₂H₅)-S-CH₂-C₆H₄-NO₂ (para)

(50) n-C₄H₉S-P(=O)(OC₂H₅)-S-CH₂-C₆Cl₄H

(51) Ph-CH₂CH₂S-P(=O)(OC₂H₅)-S-CH₂-C₆H₄-CH₃
(Mixture of ortho- and para-forms,)

(52) Ph-CH₂CH₂S-P(=O)(OC₂H₅)-S-CH₂-C₆H₃(CH₃)₂

(53) Ph-CH₂CH₂CH₂S-P(=O)(OC₂H₅)-S-C₄H₉-n

(54) Ph-CH(CH₃)-CH₂S-P(=O)(OC₂H₅)-S-C₂H₅

(55) Ph-CH(CH₃)-CH₂S-P(=O)(OC₂H₅)-S-CH₂-C(CH₃)=CH₂

(56) Ph-CH(CH₃)-CH₂S-P(=O)(OC₂H₅)-S-CH₂-Ph

(57) Ph-CH(C₂H₅)-S-P(=O)(OC₂H₅)-S-C₄H₉-n

(58) Ph-CH(CH₃)-CH₂S-P(=O)(OC₂H₅)-S-C₄H₉-n

(59) Ph-CH(CH₃)-CH₂S-P(=O)(OC₂H₅)-S-CH₂CH₂-Ph

(60) Ph-CH₂CH₂CH₂S-P(=O)(OC₂H₅)-S-CH₂C≡CH

(61) Ph-CH(CH₃)-CH₂S-P(=O)(OC₂H₅)-S-C₆H₁₁ (cyclohexyl)

(62) Ph-CH(CH₃)-CH₂S-P(=O)(OC₂H₅)-S-Ph

(63) C₂H₅O-P(=O)(S-CH₂-Ph)(S-CH₂CH₂Cl)

(64) C₂H₅O-P(=O)(S-CH₂CH₂CH₂-Ph)(S-CH₂CH₂Cl)

(65) n-C₅H₁₁O-P(=O)(S-CH₂-Ph)(S-C₂H₅)

(66) C₂H₅O-P(=O)(S-CH₂-C₆H₃Cl₂)(S-C₃H₇(iso.))

(67) C₂H₅O-P(=O)(S-CH₂-C₆H₃Cl₂)(S-C₅H₁₁(iso.))

(68) C₂H₅O-P(=O)(S-CH₂-C₆H₃Cl₂)(S-C₄H₉(iso.))

(69) C₂H₅O-P(=O)(S-CH₂-C₆H₄Cl)(S-C₄H₉(sec.))

(70) C₂H₅O-P(=O)(S-CH₂-C₆H₄Cl)(S-C₄H₉(sec.))

TABLE—Continued

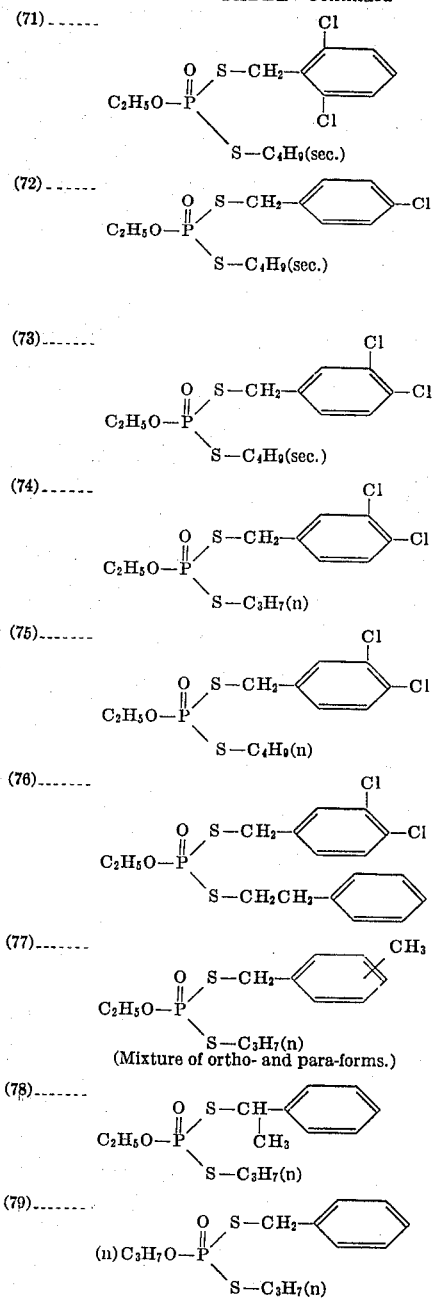

The preparation of the compounds used in the present invention will be illustrated below with reference to examples. But it is not need to say that the present invention is not limited to them.

EXAMPLE 1

To a solution comprising 12.6 g. of potassium O-ethyl-S-n-butyl phosphorodithioate and 50 ml. of water, 6.4 g. of benzyl chloride was added dropwise with stirring at 50°C. The mixture was reacted at 60°C. for 4 hours. Thereafter, the reaction liquid was extracted with toluene and was washed with a 5 percent aqueous sodium carbonate solution and then with water, and the toluene layer was dried with anhydrous glauber's salt. Subsequently, toluene was removed by distillation to obtain a light yellow oily substance which was O.ethyl-S-n-butyl-S-benzyl phosphorodithiolate, yield 89 percent. This substance was subjected to column chromatography using active alumina. The refractive index of the thus treated substance was $n_D^{18}$: 1.5510, and the elementary analysis values thereof were as follows:

|  | Found | Calculated |
|---|---|---|
| P (%) | 10.19 | 10.17 |
| S (%) | 21.11 | 21.07 |

EXAMPLE 2

To a solution comprising 15.0 g. of potassium O-ethyl-S-α-phenylethyl phosphorodithioate and 50 ml. of acetone, 6.7 g. of n-propylbromide was added dropwise with stirring at 50°C., and the mixture was refluxed for 4 hours. The deposited potassium bromide was separated by filtration and acetone was removed by distillation. The residual oily substance was dissolved in toluene and was subjected to the same treatment as in Example 1 to obtain a light yellow oily substance which was O-ethyl-S-n-propyl S-α-phenylethyl phosphorodithiolate, yield 77 percent. This substance was subjected to column chromatography using active alumina. The refractive index of the thus treated substance was $n_D^{24}$ 1.5496, and the elementary analysis values thereof was as follows:

|  | Found | Calculated |
|---|---|---|
| P (%) | 9.73 | 10.17 |
| S (%) | 20.61 | 21.06 |

EXAMPLE 3

To a solution comprising 14.2 g. of sodium 1-ethyl-S-2-phenylethyl phosphorodithioate and 50 ml. of water, 6.3 g. of benzyl chloride was added dropwise at 50°C. over a period of about 1 hour, and the mixture was reacted with stirring at 70°C. for 3 hours. Subsequently, the reaction liquid was subjected to the same treatments as in Example 1 to obtain a light yellow oily substance which was O-ethyl-S2-phenylethyl-S-benzyl phosphorodithiolate, yield 92 percent. The refractive index of the substance was $n_D^{22}$: 1.5834, and the elementary analysis values thereof were as follows:

|  | Found | Calculated |
|---|---|---|
| P (%) | 8.77 | 8.81 |
| S (%) | 18.30 | 18.18 |

EXAMPLE 4

To a solution comprising 14.9 g. of sodium O-n-butyl-S-benzyl phosphorodithioate and 50 ml. of water, 5.5 g. of ethyl bromide was added, and the mixture was reacted at 60°C. for 8 hours. Subsequently, the same treatments as in Example 1 were effected to obtain a light yellow oily substance which was O-n-butyl-S-ethyl-S-benzyl phosphorodithiolate, yield 89 percent. The refractive index of this substance was $n_D^{20}$: 1.5392, and the elementary analysis values thereof were as follows:

|  | Found | Calculated |
|---|---|---|
| P (%) | 10.10 | 10.17 |
| S (%) | 21.37 | 21.07 |

According to Examples 1 to 4, the compounds shown in the Table 1 below were synthesized.

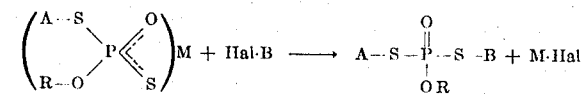

TABLE 1

| Example number | A | B | R | M | Hal | Solvent | Reaction temperature and period of reaction time | Yield, percent | Refractive index | Elementary analysis, percent - Found Cl | Found N | Found P | Found S | Calculated Cl | Calculated N | Calculated P | Calculated S |
|---|---|---|---|---|---|---|---|---|---|---|---|---|---|---|---|---|---|
| 5 | ⟨C₆H₅⟩—CH₂— | —CH₂·CH₂Cl | C₂H₅ | K | Br | C₂H₅OH | 80° C., 5 hrs. | 74 | $n_D^{22}=1.5752$ | 11.33 | | 10.04 | 22.35 | 11.43 | | 9.98 | 22.22 |
| 6 | Same as above | —CH₂·CH=CH₂ | C₂H₅ | K | Br | C₂H₅OH | 80° C., 1 hr. | 95 | $n_D^{21}=1.5737$ | | | 10.65 | 22.35 | | | 10.76 | 22.22 |
| 7 | do | —C₃H₅ (tert.) | C₂H₅ | K | Br | C₂H₅OH | 50° C., 8 hrs. | 71 | $n_D^{18}=1.5557$ | | | 10.08 | 21.11 | | | 10.20 | 21.05 |
| 8 | do | —CH₂·C≡CH | C₂H₅ | K | Cl | C₂H₅OH | Reflux, 2 hrs. | 90 | $n_D^{28}=1.5784$ | | | 10.74 | 22.50 | | | 10.84 | 22.38 |
| 9 | do | —CH₂·CH₂·CH₂Cl | C₂H₅ | K | Br | C₂H₅OH | Reflux, 5 hrs. | 90 | $n_D^{21}=1.5684$ | 10.63 | | 9.61 | | 10.94 | | 9.55 | |
| 10 | do | —CH₂·C=CH₂ / CH₃ | C₂H₅ | K | Cl | C₂H₅OH | Reflux, 3 hrs. | 94 | $n_D^{21}=1.5950$ | | | 8.90 | 18.20 | | | 8.81 | 18.18 |
| 11 | do | —CH—⟨C₆H₅⟩ / CH₃ | C₂H₅ | K | Cl | H₂O | 70° C., 2 hrs. | 93 | $n_D^{20}=1.5660$ | | | 10.18 | 21.28 | | | 10.27 | 21.19 |
| 12 | do | —CH₃ | C₂H₅ | Ka | Br | H₂O | 60° C., 5 hrs. | 85 | $n_D^{20}=1.5656$ | | | 11.13 | 23.53 | | | 11.21 | 23.21 |
| 13 | do | —C₃H₇ (n) | C₂H₅ | Ka | Br | H₂O | 60° C., 7 hrs. | 83 | $n_D^{19}=1.5339$ | | | 10.50 | 22.81 | | | 10.66 | 22.08 |
| 14 | do | —C₃H₇ (iso) | C₂H₅ | Ka | Br | C₂H₅OH | 80° C., 3 hrs. | 80 | $n_D^{22}=1.5834$ | | | 10.59 | 22.79 | | | 10.66 | 22.08 |
| 15 | Sec-C₄H₉— | —CH₂—⟨C₆H₅⟩ | C₂H₅ | Ka | Cl | H₂O | 60° C., 4 hrs. | 87 | $n_D^{20}=1.5485$ | | | 10.21 | 21.19 | | | 10.17 | 21.07 |
| 16 | ⟨C₆H₅⟩—CH₂— | —C₄H₉ (iso) | C₂H₅ | Ka | Br | H₂O | 60° C., 8 hrs. | 78 | $n_D^{19}=1.5177$ | | | 10.03 | 21.80 | | | 10.17 | 21.07 |
| 17 | n-C₃H₁₁— | —CH₂—⟨C₆H₅⟩ | C₂H₅ | K | Cl | H₂O | do | 85 | $n_D^{22}=1.5537$ | | | 9.71 | 20.40 | | | 9.73 | 20.14 |
| 18 | ⟨C₆H₅⟩—CH— / CH₃ | —CH₂—⟨C₆H₅⟩ | C₂H₅ | K | Cl | C₂H₅OH | 60° C., 10 hrs. | 75 | $n_D^{21}=1.5699$ | | | 8.13 | 17.89 | | | 8.45 | 17.50 |
| 19 | Same as above | —CH₂·CH₂·CH₂Cl | C₂H₅ | Na | Br | C₂H₅OH | 80° C., 4 hrs. | 87 | $n_D^{18}=1.5546$ | | | 9.08 | 19.10 | | | 9.14 | 18.93 |
| 20 | do | —C₄H₉ (n) | C₂H₅ | Na | Br | C₂H₅OH | do | 89 | $n_D^{21}=1.5340$ | | | 9.70 | 20.17 | | | 9.73 | 20.14 |
| 21 | n-C₃H₇— | —CH₂—⟨C₆H₅⟩ | n-C₃H₇— | Na | Cl | H₂O | 60° C., 5 hrs. | 91 | $n_D^{23}=1.5319$ | | | 9.51 | 20.37 | | | 9.66 | 20.01 |
| 22 | ⟨C₆H₅⟩—CH₂— | —CH—⟨C₆H₅⟩ / CH₃ | n-C₃H₇— | Na | Cl | H₂O | do | 75 | $n_D^{21}=1.5596$ | | | 8.36 | 17.89 | | | 8.40 | 17.40 |
| 23 | n-C₄H₉— | —CH₂—⟨C₆H₅⟩ | n-C₄H₉— | Na | Cl | H₂O | do | 93 | $n_D^{19}=1.5325$ | | | 9.31 | 19.40 | | | 9.32 | 19.29 |
| 24 | ⟨H⟩ | —CH₂—⟨C₆H₅⟩ | n-C₄H₉— | K | Cl | H₂O | 70° C., 8 hrs. | 92 | $n_D^{21}=1.5335$ | | | 10.97 | 23.27 | | | 11.09 | 22.95 |
| 25 | Same as above | —C₄H₉ (n) | n-C₄H₉— | K | Br | H₂O | 60° C., 10 hrs. | 93 | $n_D^{20}=1.5175$ | | | 10.47 | 21.80 | | | 10.48 | 21.71 |
| 26 | do | —C₄H₉ (tert.) | n-C₄H₉— | K | Cl | H₂O | 50° C., 15 hrs. | 65 | $n_D^{20}=1.5180$ | | | 10.79 | 21.99 | | | 10.48 | 21.71 |
| 27 | do | —CH₂—⟨C₆H₅⟩ | C₂H₅— | K | Cl | H₂O | 70° C., 5 hrs. | 95 | $n_D^{24}=1.5660$ | | | 9.40 | 19.81 | | | 9.40 | 19.47 |

TABLE 1—Continued

| Example number | A | B | R | M | Hal | Solvent | Reaction temperature and period of reaction time | Yield, percent | Refractive index | Elementary analysis, percent | | | | | | | | |
|---|---|---|---|---|---|---|---|---|---|---|---|---|---|---|---|---|---|---|
| | | | | | | | | | | Found | | | | | Calculated | | | |
| | | | | | | | | | | Cl | N | P | S | Cl | N | P | S |
| 28 | C₆H₅-CH₂·CH₂- | -C₄H₉(n) | C₂H₅- | Na | Br | C₂H₅OH | Reflux 5 hrs | 87 | n_D²⁰=1.5454 | | | 9.73 | 20.20 | | | 9.75 | 20.13 |
| 29 | n-C₄H₉- | -CH₂·CH₂-C₆H₅ | C₂H₅- | K | Br | C₂H₅OH | Reflux, 3 hrs | 89 | d_D²⁰=1.5452 | | | 9.74 | 20.23 | | | 9.75 | 20.13 |
| 30 | C₆H₅-CH(CH₃)- | Same as above | C₂H₅- | Na | Br | (¹) | Reflux, 5 hrs | 91 | n_D²⁰=1.5603 | | | 8.21 | 17.53 | | | 8.47 | 17.49 |
| 31 | C₆H₅-CH₂·CH₂- | ——do—— | C₂H₅ | Na | Br | C₂H₅OH | ——do—— | 89 | n_D²⁰=1.5634 | | | 8.43 | 17.50 | | | 8.47 | 17.49 |
| 32 | Same as above | -C₄H₉(sec.) | C₂H₅ | Na | Br | C₂H₅OH+H₂O | 70° C., 8 hrs | 64 | n_D²³=1.5230 | | | 10.03 | 20.85 | | | 9.75 | 20.13 |
| 33 | ——do—— | -C₃H₇(n) | C₂H₅ | Na | Cl | C₂H₅OH | Reflux, 6 hrs | 80 | n_D²⁰=1.5515 | | | 10.12 | 21.11 | | | 10.20 | 21.05 |
| 34 | ——do—— | -CH₂·C=CH₂ CH₃ | C₂H₅ | K | Br | C₂H₅OH | Reflux, 2 hrs | 81 | n_D²³=1.5545 | | | 9.72 | 20.83 | | | 9.81 | 20.25 |
| 35 | ——do—— | -CH₂·CH₂·CH₂Cl | C₂H₅ | K | Br | C₂H₅OH | Reflux, 5 hrs | 81 | n_D²¹=1.5621 | | | 9.07 | 19.03 | | | 9.16 | 18.91 |
| 36 | n-C₄H₉- | -CH₂·CH₂-C₆H₅ | C₂H₅ | K | Br | C₂H₅OH | Reflux, 4 hrs | 87 | n_D²⁷=1.5370 | | | 9.32 | 19.29 | | | 9.00 | 19.00 |
| 37 | C₆H₅-CH-CH₂- CH₃ | -C₂H₅ | C₂H₅ | K | Br | H₂O | 80° C, 4 hrs | 86 | n_D³⁰=1.5511 | | | 10.17 | 21.07 | | | 10.35 | 21.31 |
| 38 | Same as above | -C₄H₉(n) | C₂H₅ | K | Br | C₂H₅OH | Reflux, 4 hrs | 86 | n_D²⁵=1.5283 | | | 9.32 | 19.29 | | | 9.50 | 19.23 |
| 39 | ——do—— | -CH₂·CH₂-C₆H₅ | C₂H₅ | K | Br | C₂H₅OH | Reflux, 3 hrs | 83 | n_D²⁵=1.5670 | | | 8.14 | 16.85 | | | 8.29 | 16.89 |
| 40 | ——do—— | -CH₂·C=CH₂ CH₃ | C₂H₅ | K | Cl | (¹) | ——do—— | 81 | n_D²¹=1.5440 | | | 9.37 | 19.40 | | | 9.68 | 19.61 |
| 41 | C₆H₅-CH₂- | -CH₂-CH-C₆H₅ CH₃ | C₂H₅ | K | Br | C₂H₅OH | Reflux, 5 hrs | 73 | n_D²²=1.5777 | | | 8.45 | 17.50 | | | 8.30 | 17.53 |
| 42 | C₆H₅-CH₂·CH₂·CH₂- | -CH₂·CH₂·Cl | C₂H₅ | K | Br | C₂H₅OH | Reflux 5 hrs | 70 | n_D²³=1.5590 | 10.46 | | 9.14 | | 10.74 | | 9.23 | |
| 43 | Same as above | -CH₂·C≡CH | C₂H₅ | K | Br | C₂H₅OH | Reflux, 3 hrs | 87 | n_D²⁹=1.5627 | | | 9.85 | 20.40 | | | 10.10 | 20.67 |
| 44 | n-C₄H₉- | -CH₂-C₆H₄-NO₂ | C₂H₅ | K | Br | C₂H₅OH | Reflux, 5 hrs | 89 | n_D²³=1.5730 | | 4.01 | 8.86 | | | 4.12 | 8.50 | |
| 45 | n-C₄H₉- | -CH₂-C₆H₃(CH₃)CH₃ | C₂H₅ | K | Br | C₂H₅OH | Reflux, 4 hrs | 67 | n_D²⁹=1.5520 | | | 9.32 | 19.29 | | | 9.07 | 18.94 |

TABLE 1—Continued

| Example number | A | B | R | M | Hal | Solvent | Reaction temperature and period of reaction time | Yield, percent | Refractive index | Elementary analysis, percent | | | | | | | |
|---|---|---|---|---|---|---|---|---|---|---|---|---|---|---|---|---|---|
| | | | | | | | | | | Found | | | | Calculated | | | |
| | | | | | | | | | | Cl | N | P | S | Cl | N | P | S |
| 46 | n-C₄H₉— | —CH₂—(3-Cl-C₆H₄) | C₂H₅ | K | Br | H₂O | 80° C., 3 hrs | 75 | n_D²²=1.5581 | 10.46 | | 9.14 | | 10.72 | | 9.21 | |
| 47 | n-C₄H₉— | —CH₂—(2,3,5,6-Cl₄-CH₃-C₆) | C₂H₅ | K | Br | C₂H₅OH | Reflux, 5 hrs | 81 | n_D²³=1.5914 | 37.19 | | 6.50 | | 37.50 | | 6.77 | |
| 48 | —CH₂CH₂—(C₆H₄-CH₃) | —CH₂—(4-CH₃-C₆H₄) | C₂H₅ | K | Br | C₂H₅OH | Reflux, 3 hrs | 80 | n_D²⁹=1.5839 | | | 8.14 | 16.85 | | | 7.74 | 17.00 |
| 49 | Same as above | —CH₂—(C₆H₄) (o,p mixture) | C₂H₅ | K | Cl | C₂H₅OH | do | 84 | n_D²⁵=1.5879 | | | 8.45 | 17.50 | | | 8.48 | 17.73 |
| 50 | —CH₃,—CH₂—(C₆H₄) | —C₄H₉(n) | C₂H₅ | K | Br | C₂H₅OH | Reflux, 4 hrs | 70 | n_D²¹=1.5523 | | | 8.73 | 20.14 | | | 9.85 | 21.04 |
| 51 | —CH₂—(4-Cl-C₆H₄) | —C₄H₉(n) | C₂H₅ | K | Br | C₂H₅OH | Reflux, 5 hrs | 76 | n_D²³=1.5540 | 10.46 | | 9.14 | | 10.84 | | 9.15 | |
| 52 | Same as above | —CH₂·CH=CH₂ | C₂H₅ | K | Cl | (¹) | Reflux, 3 hrs | 90 | n_D²⁵=1.5780 | 10.66 | | 9.31 | | 10.77 | | 9.43 | |
| 53 | —CH₃,—CH₂—(C₆H₄) | —C₄H₉(n) | n-C₄H₉ | K | Br | C₂H₅OH | Reflux, 5 hrs | 83 | n_D³³=1.5293 | | | 8.94 | 18.51 | | | 9.07 | 18.72 |
| 54 | Same as above | —C₂H₅ | n-C₄H₉ | K | Br | H₂O | 80° C., 3 hrs | 85 | n_D²³=1.5220 | | | 9.73 | 20.15 | | | 9.96 | 20.33 |
| 55 | do | —CH₂·CH₂Cl | n-C₄H₉— | K | Br | C₂H₅OH | reflux, 5 hrs | 74 | n_D²²=1.5571 | 10.06 | | 8.79 | | 10.35 | | 8.91 | |
| 56 | (iso) C₃H₇— | —CH₂—(3,4-Cl₂-C₆H₃) | C₂H₅ | K | Cl | C₂H₅OH | do | 87 | n_D²²=1.5712 | | | 8.74 | 17.56 | | | 8.62 | 17.85 |
| 57 | —CH₂—(3,4-Cl₂-C₆H₃) | —C₅H₁₁(iso) | C₂H₅ | K | Br | C₂H₅OH | do | 77 | n_D²¹=1.5590 | | | 7.91 | 16.42 | | | 8.00 | 16.55 |

TABLE 1—Continued

| Example number | A | B | R | M | Hal | Solvent | Reaction temperature and period of reaction time | Yield, percent | Refractive index | Elementary analysis, percent | | | | | | | | |
|---|---|---|---|---|---|---|---|---|---|---|---|---|---|---|---|---|---|---|
| | | | | | | | | | | Found | | | | Calculated | | | | |
| | | | | | | | | | | Cl | N | P | S | Cl | N | P | S | |
| 58 | (iso)$C_3H_7$— | Cl,Cl-phenyl-$CH_2$— | $C_2H_5$ | K | Cl | $C_2H_5OH$ | Reflux, 4 hrs | 85 | $n_D^{22}$=1.5660 | | | 8.32 | 17.38 | | | 8.30 | 17.18 | |
| 59 | (sec.)$C_4H_9$— | Cl-phenyl-$CH_2$— | $C_2H_5$ | Na | Cl | $C_2H_5OH$ | Reflux, 2 hrs | 77 | $n_D^{22}$=1.5578 | | | 9.19 | 18.47 | | | 9.17 | 18.98 | |
| 60 | (sec.)$C_4H_9$— | Cl-phenyl-$CH_2$— | $C_2H_5$ | Na | Cl | $C_2H_5OH$ | Reflux, 4 hrs | 77 | $n_D^{24}$=1.5572 | | | 8.83 | 19.00 | | | 9.17 | 18.98 | |
| 61 | (sec.)$C_4H_9$— | Cl,Cl-phenyl-$CH_2$— | $C_2H_5$ | Na | Cl | $C_2H_5OH$ | Reflux, 5 hrs | 72 | $n_D^{24}$=1.5680 | | | 8.00 | 17.41 | | | 8.30 | 17.81 | |
| 62 | (sec.)$C_4H_9$— | Cl-phenyl-$CH_2$— | $C_2H_5$ | Na | Cl | $C_2H_5OH$ | Reflux, 4 hrs | 93 | $n_D^{24}$=1.5505 | | | 9.07 | 19.25 | | | 9.17 | 18.98 | |
| 63 | (sec.)$C_4H_9$— | Cl-phenyl-$CH_2$— | $C_2H_5$ | K | Cl | $C_2H_5OH$ | do | 86 | $n_D^{31}$=1.5645 | | | 8.42 | 17.51 | | | 8.30 | 17.18 | |
| 64 | Cl,Cl-phenyl-$CH_2$— | —$C_3H_7$(n) | $C_2H_5$ | K | Br | $C_2H_5OH$ | 75° C., 4 hrs | 75 | $n_D^{29}$=1.5688 | | | 8.79 | 17.53 | | | 8.62 | 17.85 | |
| 65 | Same as above | —$C_4H_9$(n) | $C_2H_5$ | K | Br | $C_2H_5OH$ | Reflux, 5 hrs | 81 | $n_D^{29}$=1.5627 | | | 8.03 | 17.48 | | | 8.30 | 17.18 | |
| 66 | do | —$CH_2CH_2$-phenyl | $C_2H_5$ | K | Br | $C_2H_5OH$ | Reflux, 4 hrs | 89 | $n_D^{25}$=1.5962 | | | 7.72 | 14.89 | | | 7.35 | 15.22 | |
| 67 | (n)$C_3H_7$— | $CH_3$-phenyl-$CH_2$— (o,p mixture) | $C_2H_5$ | K | Cl | $C_2H_5OH$ | Reflux, 2 hrs | 88 | $n_D^{21}$=1.5561 | | | 9.81 | 20.57 | | | 10.14 | 20.99 | |
| 68 | phenyl-$CH_2$— | —$C_3H_7$(n) | $C_3H_7$(n) | K | Br | (¹) | Reflux, 4 hrs | 75 | $n_D^{21}$=1.5370 | | | 10.17 | 21.06 | | | 10.47 | 21.51 | |

¹ Aceton.

In practical application, the phosphorodithiolates may be used either in pure form without the addition of inert carriers or in admixture with carriers for easier application of the compounds as preventive and exterminative chemicals, and may be formulated into any of the conventionally adopted forms such as, for example, dusts, wettable powders, emulsifiable concentrates, oil preparations, aerosols and granules.

The carriers to be used may be any of solids and liquids. As the solid carriers, there are used, for example, clay, talc, diatomaceous earth, bentonite, kaolin, acid clay and vermiculite. As the liquid carriers, there are employed, for example, water, alcohols, ketones, benzene, toluene, xylene, solvent naphtha, petroleum ether and purified kerosene. Further, as gas carriers there are used from gas, deodorized LPG, methyl chloride, vinyl chloride monomers, dimethyl ether, nitrogen and carbon dioxide. The abovementioned preparations can be used, either as such or after dilution with water, by such means as spraying or soil injection and can display their effects by so-called spraying to plant or soil application.

Further, the present compounds may be used in admixture with other chemicals to broaden the applicable scope thereof. For example, they may be used in admixture with organo-chlorine type fungicides such as pentachlorobenzyl alcohol and the like, organo-arsenic type fungicides such as iron methylarsonate and the like, organo-sulfur type fungicides, or antibiotics. In addition thereto, they may be used in admixture with organo-chlorine type, organo-phosphorus type, pyrethroid type or carbamate type insecticides such as γ-1,2,3,4,5,6-hexachlorocyclohexane, 1,1,1-trichloro-2,2-bis(p-chlorophenyl)ethane, 0,0-dimethyl-0-(p-nitrophenyl) phosphorothioate, S-[1,2-bis(ethoxy-carbonyl)ethyl] 0,0-dimethyl phosphorodithioate, 0,0-dimethyl S-(N-methylcarbamoylmethyl) phosphorodithioate, 0-ethyl 0-p-nitrophenyl phenylphosphonothiorate, α-naphthyl N-methyl carbamate, 0,0-dimethyl-0(p-nitro-m-methylphenyl) phosphorothioate, 3,4,5,6-tetrahydrophthalimidemethyl chrysanthemate and 3,4-dimethylphenyl N-methyl carbamate, and further with the above-mentioned fungicides. Further, they may be used in admixture with agricultural chemicals such as herbicides, e.g. 2,4-dichlorophenoxyacetic acid, 4-chloro-2-methylphenoxyacetic acid, 3,4-dichloropropionanilide, nematocides or miticides, or with fertilizers. A synergistic effects due to mixing can be expected depending on combinations with said chemicals.

The present invention will be illustrated in further detail below with reference to examples, but the kinds and mixing proportions of compounds and additives are not limited only to those shown in the examples but are variable within wide ranges. In Examples 69–96, the compounds are referred to number of the above mentioned typical compounds. All parts are based on weight.

EXAMPLE 69 DUST

3 Parts of compound (2) and 97 parts of clay are thoroughly pulverized and mixed together to obtain a dust containing 3 percent of active ingredient. In application, the dust is dusted as such.

EXAMPLE 70 DUST

4 Parts of compound (73) and 96 parts of a clay-talc mixture are thoroughly pulverized and mixed together to obtain a dust containing 4 percent of active ingredient. In application, the dust may be used either as such or in thorough admixture with a soil.

EXAMPLE 71 WETTABLE POWDER.

50 Parts of compound (7), 5 parts of a wetting agent (alkylbenzenesulfonate type) and 45 parts of diactomaceous earth are thoroughly pulverized and mixed together to obtain a wettable powder containing 50 percent of active ingredient. In application, the powder is diluted with water and is then sprayed.

EXAMPLE 72 EMULSIFIABLE CONCENTRATE.

50 Parts of compound (9), 20 parts of xylene and 30 parts of the emulsifier Sorpol 2020 (registered trade name) (polyoxyethylene phenyl phenol polymer type) are mixed together to obtain an emulsifiable concentrate having an active ingredient concentration of 50 percent. In application, the concentrate is diluted with water and is sprayed.

EXAMPLE 73 EMULSIFIABLE CONCENTRATE.

25 Parts of compound (68), 50 parts of toluene and 25 parts of the emulsifier Sorpol 2020 (registered trade name) (polyoxyethylene phenyl phenol polymer type) are mixed together to obtain an emulsifiable concentrate having an active ingredient concentration of 25 percent. In application, the concentrate is diluted with water and is sprayed.

EXAMPLE 74 OIL PREPARATION.

1 Part of compound (1) and 99 parts of purified kerosene are mixed together to obtain an oil preparation having an active ingredient concentration of 1 percent. In application, the preparation is atomized or sprayed as much or is poured into a hole bored in a soil.

EXAMPLE 75 GRANULES.

5 Parts of compound (3), 93.5 parts of clay and 1.5 parts of Gohsenol (polyvinyl alcohol) (registered trade name) are thoroughly kneaded with water, and the mixture is granulated and is then dried to obtain granules containing 5 percent of active ingredient. In application, the preparation is applied as such.

EXAMPLE 76 DUST.

3 Parts of compound (40) and 97 parts of clay are thoroughly pulverized and mixed together to obtain a dust containing 3 percent of active ingredient. In application, the dust is dusted as such.

EXAMPLE 77 DUST.

1.5 Parts of compound (22) and 98.5 parts of a clay-talc mixture are thoroughly pulverized and mixed together to obtain a dust containing 1.5 percent of active ingredient. In application, the dust may be dusted as such or may be used in thorough admixture with a soil.

EXAMPLE 78 WETTABLE POWDER.

50 Parts of compound (27), 5 parts of a wetting agent (alkylbenzenesulfonate type) and 45 parts of diatomaceous earth are thoroughly pulverized and mixed together to obtain a wettable powder containing 50 percent of active ingredient.

EXAMPLE 79 EMULSIFIABLE CONCENTRATE.

50 Parts of compound (32), 20 parts of an emulsifier (polyoxyethylene alkylphenol ether type) and 30 parts of acetonitrile are mixed together to obtain an emulsifiable concentrate having an active ingredient concentration of 50 percent. In application, the concentrate is diluted with water and is sprayed.

EXAMPLE 80 EMULSIFIABLE CONCENTRATE.

40 Parts of compound (33), 20 parts of an emulsifier (polyoxyethylene alkylphenol ether type) and 40 parts of xylene are mixed together to obtain an emulsifiable concentrate having an active ingredient concentration of 40 percent. In application, the concentrate is diluted with water and is sprayed.

EXAMPLE 81 OIL PREPARATION.

1 Part of compound (30) and 99 parts of purified kerosene are mixed together to obtain an oil preparation having an active ingredient concentration of 1 percent. In application, the preparation is atomized or sprayed as such.

EXAMPLE 82 GRANULES.

5 Parts of compound (5), 90 parts of silica powder, 4.95 parts of calcium lignosulfonate and 0.05 part of sodium alkylbenzenesulfonate are thoroughly pulverized and mixed together. The mixture is kneaded with water, is granulated and is then dried to obtain a granular preparation containing 5 percent of active ingredient. In application, the preparation is sprinkled as such.

EXAMPLE 83 DUST.

3 Parts of compound (45) and 97 parts of clay are thoroughly pulverized and mixed together to obtain a dust containing 3 percent of active ingredient. In application, the dust is dusted as such.

EXAMPLE 84 DUST.

2 Parts of compound (50) and 98 parts of a clay-talc mixture are thoroughly pulverized and mixed together to obtain a dust containing 4 percent of active ingredient. In application, the dust may be dusted as such or may be used in thorough admixture with a soil.

EXAMPLE 85 WETTABLE POWDER.

50 Parts of compound (47), 5 parts of a wetting agent (alkylbenzenesulfonate type) and 45 parts of diatomaceous earth are thoroughly pulverized and mixed together to obtain a wettable powder containing 50 percent of active ingredient. In application, the powder is diluted with water and is sprayed.

EXAMPLE 86 EMULSIFIABLE CONCENTRATE.

50 Parts of compound (46), 35 parts of xylene and 15 parts of an emulsifier (polyoxyethylene alkylphenol ether type) are mixed together to obtain an emulsifiable concentrate having an active ingredient concentration of 50 percent. In application, the concentrate is diluted with water and is sprayed.

EXAMPLE 87 EMULSIFIABLE CONCENTRATE.

40 Parts of compound (49), 40 parts of acetonitrile and 20 parts of an emulsifier (polyoxyethylene alkylphenol ether type) are mixed together to obtain an emulsifiable concentrate having an active ingredient concentration of 40 percent. In application, the concentrate is diluted with water and is sprayed.

EXAMPLE 88 OIL PREPARATION.

0.5 Part of compound (48) and 99.5 parts of purified kerosene are mixed together to obtain an oil preparation having an active ingredient concentration of 0.5 percent. In application, the preparation is atomized or sprayed as such.

EXAMPLE 89 GRANULES.

5 Parts of compound (52), 90 parts of silica powder, 4.95 parts of calcium lignosulfonate and 0.05 part of sodium alkylbenzenesulfonate are thoroughly pulverized and mixed together. The mixture is kneaded with water, is granulated and is then dried to obtain a granular preparation containing 5 percent of active ingredient. In application, the preparation is sprinkled as such.

EXAMPLE 90 DUST.

3 Parts of compound (57) and 97 parts of clay are thoroughly pulverized and mixed together to obtain a dust containing 3 percent of active ingredient. In application, the dust is dusted as such.

EXAMPLE 91 WETTABLE POWDER.

50 Parts of compound (59), 5 parts of wetting agent (alkylbenzenesulfonate type) and 45 parts of diatomaceous earth are thoroughly pulverized and mixed together to obtain a wettable powder containing 50 percent of active ingredient. In application, the powder is diluted with water and sprayed.

EXAMPLE 92 EMULSIFIABLE CONCENTRATE.

50 Parts of compound (53), 35 parts of xylene and 15 parts of an emulsifier (polyoxyethylene alkylphenol ether type) are mixed together to obtain an emulsifiable concentrate having an active ingredient concentration of 50 percent. In application, the concentrate is diluted with water and is then sprayed.

EXAMPLE 93 OIL PREPARATION.

0.5 Part of compound (55) and 99.5 parts of purified kerosene are mixed together to obtain an oil preparation having an active ingredient concentration of 0.5 percent. In application, the preparation is atomized or sprayed as such.

EXAMPLE 94 GRANULES.

5 Parts of compound (61), 90 parts of silica powder, 4.95 parts of calcium lignosulfonate and 0.05 part of sodium alkylbenzensulfonate are thoroughly pulverized and mixed together. The mixture is kneaded with water, is granulated and is then dried to obtain a granular preparation containing 5 percent of active ingredient, In application, the preparation is sprinkled as such.

EXAMPLE 95 EMULSIFIABLE CONCENTRATE.

50 Parts of compound (69), 30 parts of an emulsifier (polyoxyethylene alkylphenol ether type) and 20 parts of xylene are mixed together to obtain an emulsifiable concentrate having an active ingredient concentration of 50 percent. In application, the concentrate is diluted with water and is sprayed.

EXAMPLE 96 GRANULES.

3 Parts of compound (72), 95 parts of clay and 2 parts of Gohsenol (polyvinyl alcohol) (trade name for a product of Nippon Gosei Chemical Co., Ltd.) are thoroughly pulverized and mixed together. The mixture is kneaded with water, is granulated and is then dried to obtain a granular preparation containing 3 percent of active ingredient. In application, the preparation is sprinkled as such.

In order to substantiate the excellent preventive and exterminative effects of the present compounds, typical test results will be shown below. In Tables of the following Test Examples, the compounds are referred to by the numbers of the above-mentioned typical compounds.

TEST EXAMPLE 1

Test of Control of Rice Blast:

In a 9 cm in diameter flower pot, a rice plant (variety: "Waseasahi") was cultivated to the 3–4 leaves stage. To the rice plant, each 100 mg. per pot of the present composition in the form of dusts were individually dusted by use of a bell jar duster. After 1 day, the rice plant was sprayed and inoculated with a spore-suspension of rice blast fungi (Pyricularia oryzae). 4 Days thereafter, the number of spots generated was counted to investigate the fungicidal effects of individual compositions. The results are as shown in Table 2.

TABLE 2

| Compound | Active ingredient concentration (%) | Preventive value |
|---|---|---|
| (1) | 3 | 100 |
| (5) | 3 | 97.3 |
| (7) | 3 | 100 |
| (9) | 3 | 100 |
| (10) | 3 | 98.9 |
| (13) | 3 | 100 |
| (18) | 3 | 96.8 |
| (20) | 3 | 95.7 |
| Phenylmercuric acetate dust | 0.42 | 98.1 |
| $(CH_3S)_2\overset{O}{\overset{\|}{P}}OCH_3$ | 3 | 48.9 |
| $\begin{array}{c} CH_3S \\ CH_3O \end{array} \!\!\!\! \overset{O}{\underset{}{P}} \!\!\!\! \begin{array}{c} \\ S-CH_2CN \end{array}$ | 3 | 57.3 |
| Non-treatment | | 0 |

TEST EXAMPLE 2

Test of Curative Effects on Rice Blast:

In a 9 cm in diameter flower pot, a rice plant (variety: "Waseasahi") was cultivated to the 3 leaves stage. The rice plant was sprayed and inoculated with a spore-suspension of rice blast fungi (Pyricularia oryzae). After 1 day, the present compounds in the form of emulsifiable concentrates were diluted with water and were individually sprayed to the rice plant in a proportion of 7 ml. per pot. 3 Days thereafter, the number of spot generated was counted to investigate the fungicidal effects of individual compounds. The results are as shown in Table 3.

TABLE 3

| Compound | Active ingredient concentration (p.p.m.) | Curative value |
|---|---|---|
| (1) | 500 | 100 |
| (2) | 500 | 95.4 |
| (3) | 500 | 98.7 |
| (4) | 500 | 99.3 |
| (7) | 500 | 100 |
| (8) | 500 | 98.6 |
| (9) | 500 | 97.3 |
| (11) | 500 | 98.7 |
| (12) | 500 | 100 |
| (14) | 500 | 99.5 |
| (15) | 500 | 99.2 |
| Phenylmercuric acetate emulsifiable concentrate | 30 | 48.6 |
| $((n)C_3H_7S)_2\overset{O}{\overset{\|}{P}}OCH_3$ | 500 | 8.5 |
| 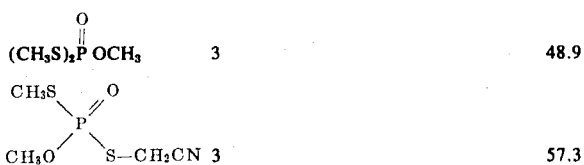 | 500 | 0 |
| $((n)C_4H_9S)_2\overset{O}{\overset{\|}{P}}\!-\!O\!-\!\!\bigcirc$ | 500 | 9.3 |
| Non-treatment | | 0 |

In Tables 2 and 3, the preventive and curative values indicate numeral values calculated according to the following equation:

$$\text{Preventive (curative) value} = \frac{\begin{array}{c}\text{Number of spots} \\ \text{in non-treated} \\ \text{area}\end{array} - \begin{array}{c}\text{Number of spots} \\ \text{in treated} \\ \text{area}\end{array}}{\text{Number of spots in non-treated area}} \times 100$$

TEST EXAMPLE 3

Test on the Control of Rice Sheath Blight:

A rice plant (variety: "Kinnanpu") was cultivated in a porcelain pot. When the rice plant had grown to a height of about 50 cm, disk inoculum (5 mm in diameter) of the mycelium of Pellicularia sasakii was inoculated onto the leaf sheaths of the rice plant. After 1 day, the present compound in the form of emulsifiable concentrates were diluted with water and were individually sprayed to the rice plant in a proportion of 10 ml. per pot. 5 Days thereafter, the number of affected leaf sheaths was counted to obtain the results as shown in Table 4.

TABLE 4

| Compound | Active ingredient concentration (p.p.m.) | Ratio of affected leaf sheaths (%) |
|---|---|---|
| (6) | 1,000 | 31.9 |
| $\begin{array}{c}CH_3S\\CH_3O\end{array}\!\!\!\!\overset{O}{\underset{}{P}}\!\!\!\!\begin{array}{c}\\S-CH_2-\bigcirc\end{array}$ | 1,000 | 80.1 |
| Non-treatment | | 88.5 |

TEST EXAMPLE 4

A rice seedling (variety: "Waseasahi") at the 3–4 leaves stage, which had elapsed 30 days after sowing, was immersed for 1 minute in an emulsion prepared by individually diluting with water to a given concentration the present compounds in the form of emulsifiable concentrates. After air-drying, the rice seedling was placed in a large size test tube. Subsequently, 30 adults of small brown planthopper (*Delphacodes striatellus* Fallen) were liberated in said test tube. After 24 hours, the number of killed insects was calculated, and the values of $LC_{50}$ were calculated from the mortality. The results are as shown in Table 5.

TABLE 5

| Compound | $LC_{50}$ (times) |
|---|---|
| (2) | 40,000 |
| (8) | 25,000 |
| $(CH_3O)_2\overset{S}{\overset{\|}{P}}-S-CH_2-\langle\text{ring}\rangle-CH_2-S-\overset{S}{\overset{\|}{P}}(OCH_3)_2$ | 250 |
| $\overset{CH_3S}{\underset{CH_3O}{\diagdown}}\overset{O}{\underset{}{\overset{\|}{P}}}\diagdown S-CH_2-\langle\text{ring}\rangle-NO_2$ | 200 |

TEST EXAMPLE 5

A mottled kidney bean plant at the 2 leaves stage, which had elapsed 20 days after sowing in a 9 cm. flower pot, was parasitized with large number of tow-spotted red spider mite (*Tetranychus telarius* Linne). The present compounds in the form of wettable powders were individually diluted with water to a given concentration, and the solution was sprayed in a proportion of 10 ml. per pot to the mottled kidney bean plant on a turn table. After 48 hours, the alive and dead of the red spider mite were observed to calculate the mortality thereof. The results are as shown in Table 6.

TABLE 6

| Compound | Active ingredient concentration (times) | Mortality |
|---|---|---|
| (2) | 50,000 | 100 |
| (6) | 20,000 | 100 |
| (7) | 10,000 | 92.5 |
| (8) | 50,000 | 100 |
| (12) | 30,000 | 98.2 |

TEST EXAMPLE 6

In a 25 cm. in diameter flower pot, a mottled kidney bean plant was grown to the 3–4 leaves stage. The plant was parasitized with 5 tow spotted red spider mite (*Tetranychus telarius* LINNE) per leaf. After 3 days, the present compounds in the form of dusts were dusted to the plant in a proportion of 200 mg per pot by use of a bell jar duster. 10 Days after the dusting, the number of propagated red spider adults was counted to obtain the results as shown in Table 7.

TABLE 7

| Compound | Number of survival insects | Control* value (%) |
|---|---|---|
| (7) | 3 | 99.9 |
| (8) | 5 | 99.9 |
| Non-treatment | 2530 | 0 |

\* Control value (percent) = $\dfrac{\text{Number of survival insects in non-treated area}}{\text{Number of survival insects in treated area} + \text{Number of survival insects in nontreated area}} \times 100$

TEST EXAMPLE 7

Test of Preventive Effects on Rice Blast:

In a 9 cm. flower pot, a rice plant (variety: "Waseasahi") was cultivated to the 3–4 leaves stage. To the rice plant, the present compounds in the form of dusts were individually dusted in a proportion of 100 mg. per pot by use of a bell jar duster. After 1 day, the rice plant was sprayed and inoculated with a spore-suspension of rice blast fungi (*Pyricularia oryzae*). 4 Days thereafter, the number of spots generated was counted to investigate the fungicidal effects of individual compounds. The results are as shown in Table 8.

TABLE 8

| Compound | Active ingredient concentration (%) | Preventive value |
|---|---|---|
| (24) | 3.0 | 100 |
| (26) | 3.0 | 100 |
| (28) | 3.0 | 99.6 |
| (29) | 3.0 | 95.7 |
| (33) | 3.0 | 100 |
| (35) | 3.0 | 92.7 |
| (38) | 3.0 | 100 |
| (41) | 3.0 | 99.5 |
| (42) | 3.0 | 100 |
| Phenylmercuric acetate | 0.42 | 95.4 |
| $(CH_3O)_2\overset{S}{\overset{\|}{P}}-S-CH_2-\langle\text{ring}\rangle-CH_2S\overset{S}{\overset{\|}{P}}(OCH_3)_2$ 3.0 | | 27.1 |
| Non-treatment | | 0 |

TEST EXAMPLE 8

Test of Curative Effects on Rice Blast:

A rice plant (variety: "Waseasahi"), which had been cultivated to the 3 leaves stage in a 9 cm. flower pot, was sprayed and inoculated with a spore-suspension of rice blast fungi (*Pyricularia oryzae*). After 1 day, the present compounds in the form of emulsifiable concentrates were diluted with water and were individually sprayed in a proportion of 7 ml. per pot. 3 Days thereafter, the number of spots generated was counted to investigate the fungicidal effects of individual compounds. The results are as shown in Table 9.

TABLE 9

| Compound | Active ingredient concentration (p.p.m.) | Curative value |
|---|---|---|
| (22) | 500 | 97.4 |
| (23) | 500 | 98.6 |
| (24) | 500 | 100 |
| (25) | 500 | 99.3 |
| (26) | 500 | 97.2 |
| (27) | 500 | 98.0 |
| (30) | 500 | 97.6 |
| (31) | 500 | 100 |
| (32) | 500 | 100 |
| (34) | 500 | 99.7 |
| (36) | 500 | 97.4 |
| (37) | 500 | 95.6 |
| (39) | 500 | 98.8 |
| (40) | 500 | 97.4 |
| Control 0,0-diethyl-S-benzyl phosphorothioate | 500 | 73.6 |
| control phenylmercuric acetate | 30 | 48.2 |
| $(n\text{-}C_3H_7S)_2\overset{O}{\overset{\|}{P}} O CH_3$ | 500 | 9.1 |
| $(CH_3S)_2\overset{O}{\overset{\|}{P}} O CH_3$ | 500 | 7.2 |
| Non-treatment | | 0 |

TEST EXAMPLE 9

Test on the Control of Rice Sheath Blight:

A rice plant (variety: "Kinnanpu") was cultivated in a porcelain pot. When the rice plant had grown to a height of about 50 cm., a dick inoculum (5 mm. in diameter) of the mycelium of Pellicularia sasakii was innoculated onto the leaf sheaths of the rice plant. After 1 day, the present compounds in the form of emulsifiable concentrates were diluted with water and were individually sprayed to the rice plant in a proportion of 10 ml. per pot. 5 Days thereafter, the number of affected leaf sheaths was counted to obtain the results as shown in Table 10.

TABLE 10

| Compound | Active ingredient concentration (p.p.m.) | Ratio of affected leaf sheath (%) |
|---|---|---|
| (25) | 1000 | 8.7 |
| (27) | 1000 | 13.2 |
| (32) | 1000 | 11.1 |
| (41) | 1000 | 33.5 |
| Non-treatment | | 100 |

TEST EXAMPLE 10

(I) Test of Effects on Smaller Brown Planthoppers:

A rice seedling which had elapsed 35 days after sowing was immersed for 1 minute in each of given concentration solution of the present compounds in the form of emulsifiable concentrates. After air-drying, the rice seedling was placed in a large size test tube. Into the test tube, 30 adults of smaller brown planthopper (*Delphacodes striatellus* Fallen) were liberated. After 24 hours, the mortality of insects at given concentrations were measured, and the values of $LC_{50}$ were calculated from said mortality. The results are as shown in Table 11.

(II) Test of Effects on Tow-Spotted Red Spider Mite (*Tetranychus telarius* LINNE):

A mottled kidney bean plant at the 2 leaves stage, which had elapsed 20 days after sowing, was parasitized with a large number of red spider adults. The plant was immersed for 1 minute in each of given concentration liquids of the present compounds in the form of wettable powders. After 48 hours, and the values of $LC_{50}$ were calculated from said mortality. The results are as shown in Table 11.

TABLE 11

| Compound | $LC_{50}$ (times) Planthoppers | Spider mites |
|---|---|---|
| (23) | 4,000 | 35,000 |
| (24) | 4,000 | 500,000 |
| (25) | 60,000 | 200,000 |
| (26) | 100,000 | 200,000 |
| (27) | 60,000 | 350,000 |
| (28) | 10,000 | 210,000 |
| (31) | 180,000 | 200,000 |
| (34) | 100,000 | 340,000 |
| (36) | 230,000 | 150,000 |
| (37) | 110,000 | 170,000 |
| (38) | 500,000 | 250,000 |
| (39) | 110,000 | 300,000 |
| (41) | 300,000 | 430,000 |
| (42) | 520,000 | 380,000 |
| 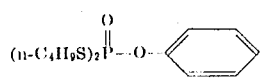 | 200 | 250 |

TEST EXAMPLE 11

Test of Preventive Effects on Rice Blast:

A rice plant (variety: "Waseasahi") was cultivated in a 9 cm. flower pot to the 3–4 leaves stage. To the rice plant, the present compounds in the form of dusts were individually dusted by use of a bell jar duster in a proportion of 100 mg. per pot. After 1 day, the rice plant was sprayed and inoculated with a spore-suspension of Pyricularia oryzae. 4 Days thereafter, the number of spots generated was counted to investigate the fungicidal effects of individual compounds, whereby each of the present compounds showed a preventive effect comparable to that of the control phenylmercuric acetate, as set forth in Table 12.

TABLE 12

| Compound | Active ingredient concentration (%) | Preventive value |
|---|---|---|
| (43) | 2.0 | 100 |
| (45) | 2.0 | 98.6 |
| (47) | 2.0 | 98.7 |
| (48) | 2.0 | 84.3 |
| (49) | 2.0 | 85.9 |
| (50) | 2.0 | 83.2 |
| (51) | 2.0 | 94.6 |
| (52) | 2.0 | 95.7 |
| Control phenylmercuric acetate | 0.42 | 93.5 |
| Control 0-ethyl-S-p-tolyl S-p-chlorobenzyl trithiophosphate (Compound disclosed in Japanese Patent Publication 15,600/66) | 2.0 | 49.1 |
| Non-treatment | | 0 |

TEST EXAMPLE 12

Test of Curative Effects on Rice Blast.

A rice plant (variety: "Waseasahi"), which had been cultivated in a 9 cm. flower pot to the 3 leaves stage, was sprayed and inoculated with a spore-suspension of *Pyricularia oryzae*. After 1 day, the present compounds in the form of emulsifiable concentrates were diluted with water and were individually sprayed to the rice plant in a proportion of 7 ml. per pot. 4 Days thereafter, the number of spots generated was counted to investigate the fungicidal effects of individual compounds, whereby the present compounds showed far more excellent curative effects than those of commercially available mercury preparation, organophosphorus fungicide and the like, as set forth in Table 13.

TABLE 13

| Compound | Active ingredient concentration (p.p.m.) | Curative value |
|---|---|---|
| (43) | 100 | 100 |
| (44) | 100 | 90.4 |
| (45) | 100 | 94.6 |
| (46) | 100 | 95.1 |
| (47) | 100 | 100 |
| Control 0,0-diethyl-S-benzyl-phosphorothioate (commercially available compounds) | 500 | 93.2 |
| | 100 | 72.8 |
| Control 0-ethyl-3-4-chloro-1-naphthylmethyl-S-2-cyanobenzyl-dithiophosphate (compound disclosed in Japanese Patent Publication 15,600/66) | 100 | 49.6 |
| Control phenylmercuric acetate | 30 | 64.7 |

| | | |
|---|---|---|
| $(CH_3S)_2\overset{O}{\overset{\|}{P}}OCH_3$ | 100 | 5.6 |
| $(n\text{-}C_4H_9S)_2\overset{O}{\overset{\|}{P}}\text{—}O\text{—}\langle\text{phenyl}\rangle$ | 100 | 7.1 |
| Non-treatment | | 0 |

TEST EXAMPLE 13

Test of the Control of Rice Sheath Blight:

A rice plant (variety: "Kinnampu") was cultivated in a porcelain pot. When the plant had grown to a height of about 60 cm., the present compounds in the form of emulsifiable concentrates were diluted with water and were individually sprayed to the plant in a proportion of 10 ml. per pot. After 2 hours, a disk inoculum (5 mm. in diameter) of the mycelium of *Pellicularia sasakii* was inoculated on the leaf sheaths of the plant. 5 Days thereafter, the number of affected leaf sheaths was counted to obtain the results as shown in Table 14.

TABLE 14

| Compound | Active ingredient concentration (p.p.m.) | Ratio of affected leaf sheaths (%) |
|---|---|---|
| (43) | 1000 | 16.8 |
| (46) | 1000 | 43.2 |
| (47) | 1000 | 14.3 |
| (48) | 1000 | 47.9 |
| Non-treatment | | 100 |

TEST EXAMPLE 14

Test of Effects on Tow-spotted Red Spider Mite (*Tetranhychus telarius* LINNE)

A mottled kidney bean plant at the 2 leaves stage, which had elapsed 20 days after sowing, was parasitized with a large number of adults of *Tetranuchus telarius*. The leaves of said plant parasitized with the red spider mite were immersed for 1 minute in each of aqueous solutions of the present compounds in the form of wettable powders. After 48 hours, the alive and dead of the insects were observed to calculate $LC_{50}$ thereof. The results are as shown in Table 15.

TABLE 15

| Compounds | $LC_{50}$ (times) |
|---|---|
| (44) | 4,000,000 |
| (46) | 1,000,000 |
| (47) | 1,000,000 |
| (48) | 1,000,000 |
| (49) | 1,000,000 |
| (52) | 600,000 |
| Dimethoate (control) | 500,000 |
| $((n)C_3H_7S)_2\overset{O}{\overset{\|}{P}}OCH_3$ | 60,000 |
| $(CH_3O)_2\overset{S}{\overset{\|}{P}}\text{—}S\text{—}CH_2\text{—}\langle\text{phenyl}\rangle\text{—}CH_2\text{—}S\overset{S}{\overset{\|}{P}}(OCH_3)_2$ | 200 |

TEST EXAMPLE 15

Well water was charged in a 500 cc. beaker. Into the beaker, full grown larvae of northern house mosquitoes were liberated, and then the present compounds in the form of granules were individually charged. After 24 hours, the alive and dead of the mosquito larvae were observed to calculate the mortality thereof. The results are as shown in Table 16.

TABLE 16

| Compound | $LC_{50}$ (p.p.m.) |
|---|---|
| (44) | 0.13 |
| (46) | 0.12 |
| (47) | 0.10 |
| (49) | 0.19 |
| (50) | 0.005 |
| (51) | 0.23 |
| (52) | 0.02 |

TEST EXAMPLE 16

Test of Curative Effects on Rice Blast:

A rice plant (variety: "Waseasahi"), which had been cultivated in a 9 cm. flower pot to the 3 leaves stage, was sprayed and inoculated with a spore-suspension of *Pyricularia oryzae*. After 1 day, the present compounds in the form of emulsifiable concentrates were diluted with water and were individually sprayed to the plant in a proportion of 7 ml. per pot. 4 Days thereafter, the number of spots generated was counted to investigate the fungicidal effects of individual compounds. The results are as set forth in Table 17, and the present compounds showed markedly excellent curative effects as compared with control compounds.

TABLE 17

| Compound | Active ingredient concentration (p.p.m.) | Number of spots per leaf |
|---|---|---|
| (53) | 500 | 0 |
| (56) | 500 | 0.8 |
| (57) | 500 | 1.2 |
| (59) | 500 | 1.0 |
| $Cl\text{—}\langle\text{naphthyl}\rangle\text{—}CH_2S\overset{O}{\overset{\|}{P}}(OC_2H_5)\text{—}SCH_2\text{—}\langle\text{phenyl-CN}\rangle$ (Known compound) | 500 | 15.6 |
| $(C_2H_5O)_2\overset{O}{\overset{\|}{P}}\text{—}SCH_2\text{—}\langle\text{phenyl}\rangle$ (Commercially available compound) | 500 | 11.8 |
| Non-treatment | | 36.7 |

TEST EXAMPLE 17

Test of Preventive Effects on Rice Blast:

To a rice plant (variety: "Waseasahi"), which had been cultivated in a 9 cm. flower pot to the 3-4 leaves stage, the present compounds in the form of dusts were dusted in a proportion of 100 mg. per pot by use of a bell jar duster. After 1 day, the plant was sprayed and inoculated with a spore-suspension of *Pyricularia oryzae*. 5 Days thereafter, the number of spots generated was counted to investigate the fungicidal effects of individual compounds. The results are as set forth in Table 18, and the present compounds were comparable in preventive effect to the control phenylmercuric acetate.

TABLE 18

| Compound | Active ingredient concentration (%) | Number of spots per leaf |
|---|---|---|
| (53) | 3.0 | 0.6 |
| (54) | 3.0 | 1.1 |
| (55) | 3.0 | 2.3 |
| (58) | 3.0 | 2.0 |
| (59) | 3.0 | 0.9 |
| (60) | 3.0 | 1.7 |
| (61) | 3.0 | 1.5 |
| (62) | 3.0 | 2.2 |
| Phenylmercuric acetate | 0.29 | 1.8 |
| $(CH_3S)_2 \overset{O}{\underset{\|}{P}} OCH_3$ | 3.0 | 15.6 |
| Non-treatment | | 23.8 |

TEST EXAMPLE 18

Test Of Effects On Tow-Spotted Spide Mite:

A mottled kidney bean plant at the 2 leaves stage, which had elapsed 20 days after sowing was parasitized with a large number of adults of *Tetranychus telarius* LINNE. The leaves of said plant parasitized with said spider mites were immersed for 1 minute in each of aqueous solutions of the present compounds in the form of wettable powders. After 48 hours, the alive and dead of the red spider were observed to calculated the mortality thereof. The results are as shown in Table 19.

TABLE 19

| Compound | $LC_{50}$ (times) |
|---|---|
| (55) | 510,000 |
| (57) | 260,000 |
| (58) | 3,000,000 |
| (59) | 900,000 |
| Control Dimethoate (Commercially available compound) | 250,000 |
| Control 0-ethyl-S,S-diphenyl phosphorodithiolate (Known compound) | 10,000 |

TEST EXAMPLE 19

Test of Insecticidal Effects on Adzuki Bean Weevil:

About 30 adults of *Callosobruchus chinensis* Linne were liberated in a stryol-made tube of 2 cm. in diameter and 7 cm. in length. Both ends of the tube were corked with polyethylene film-covered corks. Into the tube, aqueous emulsion of the present compounds in the form of emulsifiable concentrates were individually charged, and the insects were immersed therein for 1 minute. Subsequently, the insects were taken out on a filter paper and were then transferred to a dish for observation. After 24 hours, the alive and dead of the insects were observed to calculate the mrtality thereof. The results are as shown in Table 20.

TABLE 20

| Compound | $LC_{50}$ (times) |
|---|---|
| (53) | 34,000 |
| (57) | 66,000 |
| (58) | 118,000 |
| (59) | 11,000 |
| (62) | 30,000 |
| Control 0-ethyl-S,S-diphenyl-phosphorodithiolate (Known compound) | 250 |
| Control Dimethoate (Commercially available compound) | 5,000 |
| Control Sumithion (Commercially available compound) | 50,000 |
| Control $\left(\begin{array}{c}CH_3S \\ CH_3O\end{array}\right.\overset{O}{\underset{\|}{P}}S-CH_2-\left.\phantom{\Big|}\!\!\!\!\!\bigcirc\!\!\!\!\!\phantom{\Big|}\right)$ | 200 |
| Control $\left((n-C_4H_9S)_2\overset{O}{\underset{\|}{P}}-O-\!\!\!\!\!\bigcirc\!\!\!\!\!\right)$ | 600 |

TEST EXAMPLE 20

Test of Preventive Effects on Rice Blast:

A rice plant (variety: "Waseasahi") was cultivated in a 9 cm. flower pot to the 3 leaves stage. To the rice plant, given concentration liquids of test compounds were individually sprayed in a proportion of 7 ml. per pot. After 2 hours, the rice plant was sprayed and inoculated with a spore-suspension of *Pyricularia oryzae*. 4 Days thereafter, the number of spots generated was counted to investigate the fungicidal effects of the test compounds. The results are as shown in Table 21.

TABLE 21

| Compound | Active ingredient concentration (p.p.m.) | Preventive value |
|---|---|---|
| (63) | 500 | 98.2 |
| (64) | 500 | 100 |
| Phenylmercuric acetate | 30 | 97.6 |
| Non-treatment | | 0 |

TEST EXAMPLE 21

Test of Curative Effects on Rice Blast:

A rice plant (variety: "Waseasahi") was cultivated in a 9 cm. flower pot to the 3 leaves stage. The rice plant was sprayed and inoculated with a spore-suspension of *Pyricularia oryzae*. After 1 day, given concentration liquids of test compounds were individually sprayed to the plant in a proportion of 7 ml. per pot. 3 Days thereafter, the number of spots generated was counted to investigate the fungicidal effects of the compounds. The results are as shown in Table 22.

TABLE 22

| Compound | Active ingredient concentration (p.p.m.) | Curative value |
|---|---|---|
| (63) | 500 | 97.8 |
| (64) | 500 | 96.8 |
| Phenylmercuric acetate | 30 | 50.4 |
| Non-treatment | | 0 |

TEST EXAMPLE 22

In a porcelain Wagner pot, a pea plant was grown to a height of 20 cm. The plant was parasitized with a large number of adults of *Tetranychus telarius* Linne. Subsequently, 0.02 percent solution of the emulsifiable concentrate of Example 95 shown before was applied to the root portion of said plant in a proportion of 20 cc. per pot. When observed after 10 days, all the red spider had been killed.

TEST EXAMPLE 23

Test of Preventive Effects on Rice Blast:

The procedure of TestExample 21 was repeated except that the following compounds were used instead of the compounds (63) and (64). The results are shown in Table 23.

TABLE 23

| Compound | Active ingredient concentration (%) | Preventive value |
|---|---|---|
| (66) | 3.0 | 94 |
| (67) | 3.0 | 96 |
| (69) | 3.0 | 94 |
| (71) | 3.0 | 97 |
| (73) | 3.0 | 93 |
| (74) | 3.0 | 95 |
| (76) | 3.0 | 93 |
| (77) | 3.0 | 92 |
| (78) | 3.0 | 94 |
| (79) | 3.0 | 98 |
| Non-treatment | | 0 |

TEST EXAMPLE 24

Effect of Controlling Powdery Mildew of Cucurbitaceous Plants:

Pumpkin plants (variety: "Heiankogiku") were cultivated in the flower pots of 12 cm. in diameter. When the plant had grown to the 3–4 leaves stage, they were individually sprayed with 7 ml/pot of each of given concentration solutions of test chemicals in the form of wettable powders. One day after, the pumpkin seedlings were sprayed to inoculate with a spore-suspension of cucurbitaceous plant powdery mildew fungi (Sphaerotheca fuliginea). 10 Days thereafter, the state of disease of 4 leaves at the upper portion of each plant was observed and the diseased degree of the plant was calculated from the area of diseased spots generated.

In each treatment, 7 pots were tested to obtain the result shown in Table 24 below. As seen in the table, the present compounds showed markedly excellent controlling effects as compared with that of the conventional fungicide, sulfur.

TABLE 24

| Compound | Active ingredient concentration (p.p.m.) | Degree of damage |
|---|---|---|
| (66) | 1,000 | 8.6 |
| (68) | 1,000 | 15.6 |
| (70) | 1,000 | 10.3 |
| (72) | 1,000 | 9.4 |
| (75) | 1,000 | 17.4 |
| (76) | 1,000 | 19.5 |
| (78) | 1,000 | 16.3 |
| (79) | 1,000 | 9.7 |
| Sulfur* | 2,500 | 10.2 |
| Non-treatment | | 67.8 |

* Commercially available fungicide for controlling the powdery mildew.

TEST EXAMPLE 25

The procedure of Test Example 14 was repeated substituting the following compounds for the compounds used in said Example. The results are shown in Table 25.

TABLE 25

| Compound | $LC_{50}$ (times) |
|---|---|
| (66) | 430,000 |
| (67) | 1,300,000 |
| (68) | 9,600,000 |
| (69) | 13,000,000 |
| (70) | 8,600,000 |
| (71) | 12,000,000 |
| (72) | 8,000,000 |
| (73) | 46,000,000 |
| (74) | 6,600,000 |
| (75) | 12,000,000 |
| (76) | 1,200,000 |
| (77) | 200,000 |
| (78) | 380,000 |
| (80) | 200,000 |

TEST EXAMPLE 26

The procedure of Test Example 15 was repeated substituting the following compounds for the compounds used in said Example. The results are shown in Table 26.

TABLE 26

| Compound | $LC_{50}$ (p.p.m.) |
|---|---|
| (67) | 0.036 |
| (68) | 0.03 |
| (69) | 0.03 |
| (70) | 0.016 |
| (71) | 0.011 |
| (72) | 0.027 |
| (73) | 0.005 |
| (74) | 0.062 |
| (76) | 0.022 |

TEST EXAMPLE 27

The procedure of Test Example 19 was repeated substituting the following compounds for the compounds used in said Example. The results are shown in Table 27.

TABLE 27

| Compound | $LC_{50}$ (times) |
|---|---|
| (66) | 42,000 |
| (68) | 235,000 |
| (69) | 215,000 |
| (70) | 130,000 |
| (71) | 330,000 |
| (72) | 300,000 |
| (73) | 240,000 |
| (74) | 130,000 |
| (75) | 215,000 |
| (77) | 128,000 |
| (78) | 71,000 |
| (79) | 75,000 |

What we claim is:

1. A method for controlling, insects and fungi, which comprises contacting, the insects and fungi with an insecticidally and fungicidally effective amount of a phosphorodithiolate of the formula $$A-S-\overset{\overset{O}{\|}}{\underset{\underset{R}{|}}{P}}-S-B$$

wherein R is $C_2 - C_5$ alkyl, A is phenylalkyl of the formula

wherein D is $C_1 - C_3$ alkylene, X is hydrogen, chlorine, $C_1 - C_3$ alkyl or nitro and n is an integer of 1 to 5, and B is $C_2-C_{10}$ alkyl, $C_3 - C_4$ alkenyl, propargyl, chlorinated $C_2 - C_3$ alkyl, cyclohexyl or a phenylalkyl group of the formula

wherein D' is $C_1 - C_3$ alkylene and X and n have the same meanings as defined above, provided that the total number of carbon atoms of the alkylenes of D and D' is 3 or more when both A and B are phenylalkyl.

2. The method according to claim 1 wherein the phosphorodithiolate is O-ethyl-S-n-butyl-S-benzylphosphorodithiolate, O-n-butyl-S-ethyl-S-benzylphosphorodithiolate or O-ethyl-S-sec-butyl-S-benzylphosphorodithiolate.

3. A method for protecting plants from insects and fungi, which comprises applying to said plants an insecticidally and fungicidally effective amount of a phosphorodithiolate as defined in claim 1.

4. The method according to claim 1, wherein the alkyl of R is ethyl, straight or branched propyl, straight or branched butyl or straight or branched pentyl.

5. The method according to claim 1, wherein R is ethyl or n-butyl; A is phenethyl or phenpropyl and B is benzyl or 3,4-dichlorobenzyl.

6. An insecticidal and fungicidal composition consisting of an insecticidally and fungicidally effective amount of a phosphorodithiolate as defined in claim 1 and an agriculturally acceptable carrier.

* * * * *